(12) United States Patent
Kraemmer et al.

(10) Patent No.: US 11,346,721 B2
(45) Date of Patent: May 31, 2022

(54) INTERFEROMETER DEVICE AND METHOD FOR OPERATING AN INTERFEROMETER DEVICE

(71) Applicant: Robert Bosch GmbH, Stuttgart (DE)

(72) Inventors: Christoph Daniel Kraemmer, Karlsruhe (DE); Maximilian Busch, Reutlingen (DE); Michael Kutschbach, Wolfschlugen (DE); Reinhold Roedel, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/924,278

(22) Filed: Jul. 9, 2020

(65) Prior Publication Data

US 2021/0010866 A1    Jan. 14, 2021

(30) Foreign Application Priority Data

Jul. 11, 2019   (DE) ..................... 10 2019 210 244.1

(51) Int. Cl.
*G01J 3/45* (2006.01)
*G01J 3/02* (2006.01)
*G01J 3/26* (2006.01)

(52) U.S. Cl.
CPC .............. *G01J 3/45* (2013.01); *G01J 3/0205* (2013.01); *G01J 3/26* (2013.01)

(58) Field of Classification Search
None
See application file for complete search history.

(56) References Cited

U.S. PATENT DOCUMENTS

| 2012/0050751 | A1 | 3/2012 | Blomberg | |
|---|---|---|---|---|
| 2014/0092282 | A1* | 4/2014 | Morishita | G01J 3/0205 348/262 |
| 2014/0132946 | A1* | 5/2014 | Sebastian | G01J 3/021 356/51 |
| 2016/0263910 | A1* | 9/2016 | Kanai | G01J 3/26 |
| 2016/0363760 | A1* | 12/2016 | Matsushita | G01J 3/36 |
| 2019/0368931 | A1* | 12/2019 | Grueger | G01J 3/18 |

FOREIGN PATENT DOCUMENTS

| DE | 10 2010 060 747 A1 | 5/2012 |
|---|---|---|
| WO | 2012/098297 A1 | 7/2012 |

* cited by examiner

*Primary Examiner* — Shawn Decenzo
(74) *Attorney, Agent, or Firm* — Maginot, Moore & Beck LLP

(57) ABSTRACT

An interferometer device includes an interferometer unit with at least two mirrors disposed in parallel, wherein at least one of the mirrors is actuatable parallel to the other mirror and a first distance between the two mirrors is alterable. The interferometer device further includes at least one deflection mirror disposed downstream of the interferometer unit in a light transmission direction of light from the interferometer unit and a detector device, onto which the light is able to be aligned by the deflection mirror. The detector device includes at least two differently sensitive detection regions for transmitted wavelengths or wavelength ranges of the light, which detection regions are spatially separated from one another and able to be irradiated separately by the deflection mirror.

13 Claims, 3 Drawing Sheets

INTERFEROMETER DEVICE AND METHOD FOR OPERATING AN INTERFEROMETER DEVICE

This application claims priority under 35 U.S.C. § 119 to patent application number DE 10 2019 210 244.1, filed on Jul. 11, 2019 in Germany, the disclosure of which is incorporated herein by reference in its entirety.

The present disclosure relates to an interferometer device and a method for operating an interferometer device.

BACKGROUND

Fabry Perot interferometers (FPI) advantageously render it possible to obtain wavelength-tunable spectral filters with a high degree of miniaturization. MEMS technology (microelectromechanical components) can be advantageously suitable to this end. What can be exploited here is that a cavity consisting of two plane parallel, highly reflective mirrors at a distance from one another (cavity length) in the optical wavelength range exhibits strong transmission only for wavelengths for which the cavity length corresponds to an integer multiple of half the wavelength. The cavity length can be altered by the application of electrostatic or piezoelectric actuators, for example. Consequently, it is possible to provide a filter element that alters the wavelengths of the transmission (spectrally tunable filter element). With regard to the functional range of conventional FPIs, an occurrence of higher orders of transmitted modes can restrict the functional range of the FPI. Expressed differently, the FPI with a certain cavity length could be transmissive for more than one wavelength. Higher modes can have shorter wavelengths, and so the operating range (usable wavelength range, free spectral range (FSR)) can be limited toward short wavelengths. However, an operation over the greatest possible wavelength range may be desirable for analytic applications.

US 2012/050751 A1 describes a Fabry Perot interferometer; it does not disclose an alignment on a plurality of detectors using a deflection mirror.

SUMMARY

The present disclosure develops an interferometer device and a method for operating an interferometer device.

Preferred developments are disclosed in the following description.

The concept underlying the present disclosure consists of providing an interferometer device with an extended usable wavelength range, which is distinguished by an option for identifying different orders.

According to the disclosure, the interferometer device comprises an interferometer unit with at least two mirrors disposed in parallel, wherein at least one of the mirrors is actuatable parallel to the other mirror and a first distance between the two mirrors is alterable; at least one deflection mirror, which is disposed downstream of the interferometer unit in a light transmission direction of light transmitted by the interferometer unit; and a detector device, onto which the light is able to be aligned by the deflection mirror, wherein the detector device comprises at least two differently sensitive detection regions for transmitted wavelengths or wavelength ranges of the light, which detection regions are spatially separated from one another and able to be irradiated separately by the deflection mirror.

Advantageously, the interferometer device can serve as a spectrometer.

The interferometer device can be formed as a microelectromechanical component (MEMS).

The deflection mirror allows detection regions to be irradiated with light in a manner spatially separated from one another and with a time offset, for instance with light of the same wavelength or with light of different wavelengths or wavelength ranges.

According to one preferred embodiment of the interferometer device, the detector device comprises one detector with two spatially separated detection regions or a first detector with a first detection region and a second detector, disposed in spatially separated fashion, with a second detection region.

Here, the wavelength ranges that can be used to irradiate the detection regions can differ according to the expected orders; thus, a first detection region can be irradiated with a first wavelength range which could contain only first orders of the radiation transmitted by the interferometer unit and a second detection region can be irradiated with a second wavelength range which could contain only second or higher orders of the radiation transmitted by the interferometer unit. Likewise, these detection regions or further detection regions with wavelengths of higher orders can be irradiated separately.

According to one preferred embodiment of the interferometer device, the detection regions each comprise a highly sensitive intensity region and a weakly sensitive intensity region, wherein the highly sensitive intensity regions of two adjacently disposed detection regions at least partly overlap in terms of wavelength.

In terms of capturing intensity, the highly sensitive intensity region can be more sensitive than the weakly sensitive intensity region. In this way, the respective detection region can better capture the wavelength range lying in the sensitivity range of the highly sensitive intensity region and another wavelength range, which is located in the weakly sensitive intensity region, can be captured in weaker fashion. Thus, the detection regions can be designed in such a way that the desired wavelengths to be detected fall in the highly sensitive intensity region and hence their probability of detection is higher than for wavelengths in the weakly sensitive intensity region.

According to one preferred embodiment of the interferometer device, the detection regions comprise different high pass and/or low pass and/or bandpass filters and have a different sensitivity at respective wavelengths.

By using high pass and/or low pass and/or bandpass filters, it is advantageously possible in the respective detection region to only pass that portion of the radiation wanted for detection in this detection region.

According to one preferred embodiment of the interferometer device, the latter comprises an optical element, which is disposed between the interferometer unit and the deflection mirror and/or between the deflection mirror and the detector device.

The optical element allows the light beams transmitted by the interferometer unit to be steered onto the deflection mirror and be focused, for example in the highly sensitive intensity region.

According to one preferred embodiment of the interferometer device, the latter comprises a control device, which is connected to the interferometer unit, the detector device, and the deflection mirror and configured to control an actuation of the mirrors of the interferometer unit and to change the alignment of the deflection mirror from one of the detection regions to the other, depending on the transmitted wavelength of the light.

By way of example, the detection regions can be designed for wavelengths of different orders of transmitted intensity maxima. Thus, for example, the first detector can identify the maxima of the first order only and can be sensitive only to such wavelengths. Then, for example, only the second detector could be sensitive to maxima of second or higher order, with these sensitivities being able to be obtained by different filters, for example. If the first detector is irradiated first, followed by the second detector, with a constant wavelength, this wavelength can be identified as a maximum of first or higher order, depending on which of the detectors identifies a signal (maximum). As an alternative thereto, a certain first wavelength range can irradiate the first detector and can then also irradiate the second detector. However, the wavelength ranges could also differ entirely in terms of their wavelengths or partly overlap. In order to be able to steer the radiation onto the respective detector and in order to be able to regulate the filter effect of the mirror spacings, the control device is able to control the actuation of the mirror spacings and the deflection of the deflection mirror.

According to one preferred embodiment of the interferometer device, the detection regions are designed for wavelengths of different orders of transmitted intensity maxima.

According to the disclosure, the method for operating an interferometer device includes providing an interferometer device according to the disclosure; actuating at least one of the mirrors and altering the first distance; and aligning the deflection mirror onto the detection regions and irradiating the detection regions in such a way that light of the same wavelength is successively radiated onto different detection regions or each of the detection regions is irradiated by a different wavelength range.

Advantageously, the method can also be distinguished by the features, and the advantages thereof, already specified in conjunction with the interferometer device, and vice versa.

According to one preferred embodiment of the method, the detection regions are designed for wavelengths of different orders of transmitted intensity maxima and the wavelength ranges to be detected partly overlap or differ completely from one another or directly adjoin one another.

According to one preferred embodiment of the method, a first wavelength range comprises modes of first order and a second wavelength range comprises modes of second order.

Higher modes can have shorter wavelengths, and so the operating range (usable wavelength range, free spectral range) can be limited toward short wavelengths. However, for analytic applications, operation over a wavelength range that is as large as possible can be achieved and different modes can be detected in different detection regions.

According to one preferred embodiment of the method, an operating frequency of the deflection mirror is greater than an actuation frequency of the interferometer unit.

This allows the mirror to be swiveled between the detection regions multiple times at a respective actuation position.

According to one preferred embodiment of the method, the deflection mirror is swiveled multiple times between the detection regions at a respective actuation position of the mirrors and a signal from the detection regions is correlated with the operating frequency of the deflection mirror and a background light impinging on the detection regions is ascertained.

Advantageously, the relation between the signal from the detection regions and the operating frequency of the deflection mirror allows determination of when background light is measured and when light from the interferometer device is incident.

According to one preferred embodiment of the method, the detection regions are irradiated in such a way that, in the case of constant transmitted wavelengths of the interferometer unit, one or more alignment angles of the deflection mirror are varied and an intensity is determined for each alignment angle of the deflection mirror and the angle of incidence of the light on the interferometer unit is ascertained therefrom.

Here, the dependence of the intensity for each alignment angle of the deflection mirror at the respective detection region can be taken into account and the angle of incidence can be deduced. Here, an alignment of the deflection mirror can be calibrated in advance.

Here, the intensity for each alignment angle of the deflection mirror can be measured at the respectively irradiated detector.

Further features and advantages of embodiments of the disclosure emerge from the following description, with reference being made to the attached drawings.

BRIEF DESCRIPTION OF THE DRAWINGS

The present disclosure is explained in more detail below on the basis of the exemplary embodiments provided in the schematic figures of the drawing.

In detail.

In the figures, the same reference signs denote the same or functionally equivalent elements.

DETAILED DESCRIPTION

Figure 1:
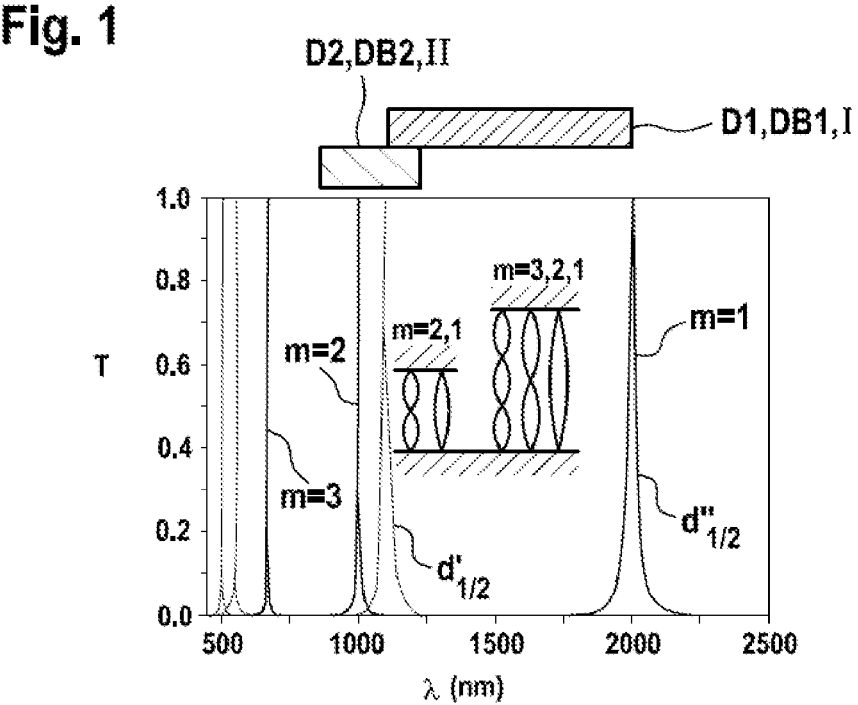
FIG. 1 shows a schematic graph of higher order modes for irradiating detector regions according to one exemplary embodiment of the method of the present disclosure.

FIG. 1 shows a schematic graph of higher order modes for irradiating detector regions according to one exemplary embodiment of the method of the present disclosure.

The irradiation of the detector device can be implemented in such a way in a first cycle I that, for example, the light transmitted by the interferometer unit can be steered, using the deflection mirror, onto first detector D1 and the latter can measure the transmission T (following suitable referencing). The transmission T itself may comprise different orders of modes. Advantageously, this can be implemented in such a way that the wavelengths transmitted by the interferometer unit are restricted by suitable further filters or by the region of high sensitivity of the detector D1 to a wavelength range on the detector D1, which can only contain first orders of the radiation transmitted by the interferometer unit. Subsequently, the second detector D2 can be irradiated in such a way that the wavelengths transmitted by the interferometer unit are restricted by way of suitable filters or by the region of high sensitivity of the detector D2 to a further wavelength range on the detector D2, which can only contain second orders of the radiation transmitted by the interferometer unit.

The corresponding orders of the transmitted radiation can be comprised in the respective wavelength ranges following appropriate filtering of the radiation, either by filters upstream of the detectors or by virtue of the fact that the detectors can be chosen to be sensitive only to the wavelengths of the corresponding orders. Here, the detectors could have different sensitivities to different wavelength ranges and consequently detect the desired orders and, for example, be insensitive to other orders in each case. Alternatively, in light irradiating the detector, a respective order that is unwanted for the detection could have been removed at this detector by filters.

Expressed differently, the first detector D1 can measure a wavelength range which the interferometer unit can traverse with modes of the first order (or fundamental modes) of the transmittable wavelengths, without reaching a spectral initial position (the wavelength thereof) of a higher order mode (second mode). By way of example, the first wavelength range can lie between 2000 nm and 1100 nm in the case of a travel of the mirror devices with the first distance d1/2' of approximately 1000 nm to d1/2" of approximately 550 nm. The detectors can each comprise filters which only transmit the specific orders, for the purposes of sensing the desired orders.

The description of the method with first and second order of the light transmitted by the interferometer unit is exemplary. The method can also be used with other orders, for example second and third order.

The second detector can measure transmission T (following suitable referencing). In a second cycle II, the transmitted light can be steered onto the second detector D2. The travel of the first distance can be chosen in such a way that the wavelength ranges measured at the first detector D1 and at the second detector D2 overlap. For an exemplary operation with the first and second order, this means the maximum first distance in the second cycle II can be slightly greater than the maximum first distance from the first cycle I, i.e., approximately 1200 nm, and so it is possible to pass over a region already measured by the first detector D1. This can implement an intensity calibration. However, the second cycle II can also adjoin the first wavelength range without such an overlap, for example in terms of wavelength, or comprise a gap (no spectrum then being generated therein). During the measurement of the second detector D2, it is then possible to travel to the initial region of those wavelengths (the mirror spacing is shifted) in which no modes of third or higher order are expected, for example to a first distance of approximately 850 nm.

Alternatively, it is also possible to set different wavelength ranges with or without overlap between the wavelength ranges that can be passed over in the two cycles. This allows the wavelength range—expressed differently, the work range—to be set in each detector as desired (i.e., which wavelengths are passed over).

Moreover, instead of having measurement cycles follow one another in time, the deflection mirror could be operated at a high frequency (high frequency of swiveling of the mirror) and the measurements of the two detectors D1 and D2 at the same first distance can be carried out quickly in succession.

This can implement a high frequency travel (twist) of the deflection mirror, in particular at a frequency greater than the operating frequency of the interferometer unit, and so the deflection mirror can switch between the two detectors multiple times in the case of substantially constant transmission wavelength(s) of the interferometer unit.

Consequently, the signal of the detectors D1 and D2 can subsequently be correlated with the operating frequency of the deflection mirror by means of a signal correlation method such as a lock-in method, and so the background light (e.g., stray light not originating from the deflection mirror) can be suppressed. In the case of a single detector with two separate regions and different sensitivities in the wavelength or intensity, additional use can still be made of the phase angle of the detector signal relative to the oscillation phase (deflection phase) of the deflection mirror in order to separate different orders of modes. This can be implemented, particularly when using a plurality of periods of the movement of the deflection mirror per recorded data point, in the subsequent spectrum on the detector device.

Figure 2:
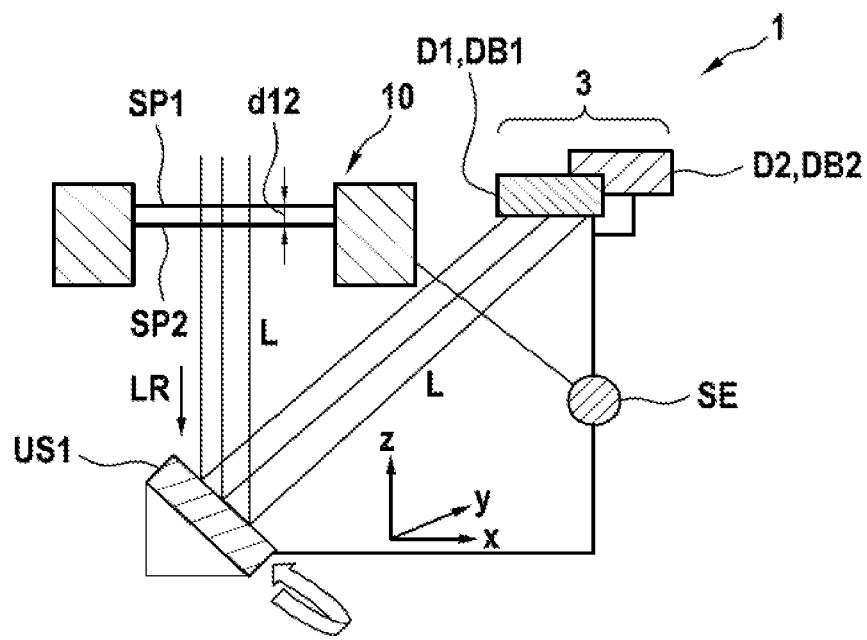
FIG. 2 shows a schematic arrangement of the interferometer device according to one exemplary embodiment of the present disclosure.

FIG. 2 shows a schematic arrangement of the interferometer device according to one exemplary embodiment of the present disclosure.

The interferometer device 1 comprises an interferometer unit 10 with at least two mirrors SP1 and SP2 disposed in parallel, wherein at least one of the mirrors SP1 or SP2 is actuatable parallel to the other mirror and a first distance d12 between the two mirrors SP1 and SP2 is alterable; at least one deflection mirror US1, which is disposed downstream of the interferometer unit 10 in a light transmission direction LR of light L transmitted by the interferometer unit 10; and a detector device 3, onto which the light L is able to be aligned by the deflection mirror (US1), wherein the detector device 3 comprises at least two differently sensitive detection regions (DB1, DB2) for transmitted wavelengths or wavelength ranges of the light L, which detection regions are spatially separated from one another and able to be irradiated separately by the deflection mirror (US1).

The detector device 3 can comprise one detector with two (or more) spatially separated detection regions DB1 and DB2 or a first detector D1 with a first detection region DB1 and a second detector D2, disposed in spatially separated fashion, with a second detection region DB2. The deflection mirror US1 could also comprise a plurality of deflection mirrors and could direct the light L, which arises in the case of an appropriate setting of the first distance in the interferometer unit 10, to any one of the detectors or detector regions as desired, successively or alternately. The deflection from one detector region to the other (from one detector to the other) can be implemented in such a way that an operating frequency of the deflection mirror (for swiveling) can be greater than an actuation frequency (for displacing the mirror devices) of the interferometer unit.

As a result of the deflection mirror US1, a detector region DB1 or DB2 can be irradiated with light, for instance of the same wavelength or with different wavelengths or wavelength ranges, in a manner spatially separated from one another and with a time offset. Here, the wavelength ranges can differ according to the orders to be expected; thus, a first detection region DB1 can be irradiated with a first wavelength range which could contain only first orders of the radiation transmitted by the interferometer unit and a second detection region DB2 can be irradiated with a second wavelength range which could contain only second or higher orders of the radiation transmitted by the interferometer unit. Likewise, these detection regions or further detection regions with wavelengths of higher orders can be irradiated separately.

The detection regions DB1 and DB2 themselves can comprise identical wavelength ranges and can have a different sensitivity to respective wavelengths, in each case by means of different high pass or low pass filters. Expressed differently, in the region of low sensitivity for such a wavelength, the corresponding detector region can only identify great variations in the intensity whereas, in the region of high sensitivity, the same detector region can identify a very much smaller variation in the intensity at the wavelength there and can identify the variation as an intensity maximum (and the wavelength thereof). The regions of high sensitivity can substantially orient themselves on the free spectral ranges of the orders of the transmitted modes (mode number m=1, 2, 3) and can be designed accordingly. The free spectral range can correspond to the distance in the wavelength between two adjacent modes.

The individual detection regions themselves can also comprise a plurality of low pass or high pass filters on the respective detection region, advantageously covering different wavelengths.

The detection regions DB1 and/or DB2 can each comprise a highly sensitive intensity region and a weakly sensitive intensity region, wherein the highly sensitive intensity regions of two adjacently disposed detection regions could at least partly overlap in terms of wavelength or else be completely different, for example also being able to form a gap between the wavelength ranges.

The deflection mirror can comprise a micromirror.

The interferometer device 1 can also comprise a control device SE, which can be connected to the interferometer unit 10, the detector device 3, and the deflection mirror US1 and can be configured to control an actuation of the mirrors SP1 and SP2 and to change the alignment of the deflection mirror US1 from one of the detection regions DB1 or DB2 to the other, depending on the transmitted wavelength of the light L.

By way of example, the detection regions DB1 and DB2 can be designed for wavelengths of different orders of transmitted intensity maxima. Thus, for example, the first detector can identify the maxima of the first order only and can be sensitive only to such wavelengths. Then, for example, only the second detector D2 could be sensitive to maxima of second or higher order. If the first detector D1 is irradiated first, followed by the second detector D2, with a constant wavelength, this wavelength can be identified as a maximum of first or higher order, depending on which of the detectors identifies a signal (maximum). As an alternative thereto, a certain first wavelength range can initially irradiate the first detector and can then also irradiate the second detector. However, the wavelength ranges could also differ entirely in terms of their wavelengths or partly overlap.

There can be a calibration of the detector (a so-called handshake) in the case of a partial overlap.

Thus, in a respective actuation position of the mirrors, the deflection mirror US1 can swivel multiple times between the detection regions and a signal from the detection regions DB1 and DB2 can be correlated with the operating frequency of the deflection mirror and a background light impinging on the detection regions DB1 and/or DB2 can be filtered out.

Such a separation of detection regions can advantageously extend the usable spectral range of the interferometer device since maxima of higher order may be identifiable. The detection regions can be available as different local regions on one detector or as separate individual detectors.

Detectors disposed in spatially separated fashion can be the same or different, for example comprise photodiodes made of InGaAs (indium gallium arsenide), Si (silicon), Ge (germanium), InAs (indium arsenide), PbSe (lead selenide) or else pyroelectric detectors or bolometers.

In the example of FIG. 2, the detectors are disposed in succession in the y-direction and the deflection mirror US1 is movable, advantageously rotatable, at least in the y-direction.

The spectral regions (detection regions) of the detector or detectors can be designed in such a way that, individually, they can have a narrow enough sensitivity in terms of the sensitivity over a wavelength that, in each case, substantially only one maximum (mode of the Fabry Perot interferometer) can be detected at the same time. It should be specified here that the interferometer unit can comprise a Fabry Perot interferometer.

However, together, the detection regions DB1, DB2 can span more than the free spectral range of an (FPI) mode.

The superposition of all detection regions with high sensitivity can be broader in terms of wavelength than a free spectral range of an interferometer unit. However, each individual detection region with a high sensitivity can be narrow enough (in terms of wavelength) so that substantially only the light of one mode can be detected.

Here, a small overlap region of the wavelength ranges in the detection regions DB1 and DB2 can be advantageous in order to simplify subsequent stringing together of the detected partial spectra.

The interferometer unit can comprise a Fabry Perot interferometer (FPI).

For Fabry Perot interferometers, the resonant condition for maximum transmission can be satisfied not only for the fundamental mode but also for modes of higher orders (for example in the case where the first distance could equal an integer multiple of half the wavelength to be transmitted). As a result, the spectrally usable range of a pass wavelength-variable (tunable) Fabry Perot interferometer can be restricted toward short wavelengths by a next higher mode; by way of example, the spectrum can have the spectra of higher orders overlaid without a long pass filter. However, for numerous applications, for example food analysis or, generally, chemometrics, a usable spectrum that is as broad as possible is usually desirable. By way of the measurements obtained, larger and higher resolved, spectrally measurable regions (wavelength ranges) can be classified or quantified better and more correctly, and this allows even more applications to be covered.

Moreover, the deflection mirror can be used to measure a dark current on the detector device. A dark current measurement can always be advantageously implemented when the deflection mirror is just steering light transmitted by the interferometer unit to the other detector region or the other detector instead of to the region or detector where the dark current of this region (detector) should be measured at this time. Alternatively, it is also possible to choose the oscillation amplitude of the deflection mirror in such a way that the light can be deflected completely away from the detector area (region) at certain times; this can be advantageous, especially when using an individual detector with a plurality of filters. Advantageously, the dark current measurement can be implemented easily since, by means of the deflection mirror, light can be completely deflectable away from the detection region with a dark current to be measured.

Moreover, manufacturing tolerances from an alignment of the optical components (FPI, deflection mirror, detector device, optical elements therebetween) with respect to one another can be compensated. To this end, an adjustment, for instance, can be implemented, advantageously at a fixed pass wavelength, wherein the alignment of the deflection mirror can be varied (passed) in a defined wavelength range (or at a constant wavelength) and, in the process, the intensity can be measured at one of the detector regions or detectors such that it is possible to determine (identify) an alignment of the deflection mirror with a maximum intensity to be detected. This can yield a better alignment for the operation of the interferometer device. Expressed differently, the position of the deflection mirror in relation to the detector devices can be adapted to the spatial relative position (angle) of the intensity maxima.

Moreover, information about the angle of incidence of the light can be ascertained at a fixed pass wavelength, wherein the alignment of the deflection mirror can be calibrated in advance. The intensity of the detector device (region, first or second detector) can also be evaluated here on the basis of the alignment of the deflection mirror. With knowledge about the angle of incidence of the maximum intensity to be received at the detector device, it is possible to carry out a correction of the wavelength shift where necessary since the wavelength transmitted by the interferometer unit may be influenced by the angle of incidence on the interferometer unit. In this way, it may also be possible to increase the admissible range for the angle of incidence. In this case, there can be a better alignment for the operation of the interferometer device and an extended admissible angle of incidence (increased intensity) can be obtained.

The usable spectral range of the interferometer device can be extended by way of the interferometer device according to the disclosure, wherein virtually the entire intensity transmitted by the interferometer device can be used.

Figure 3:
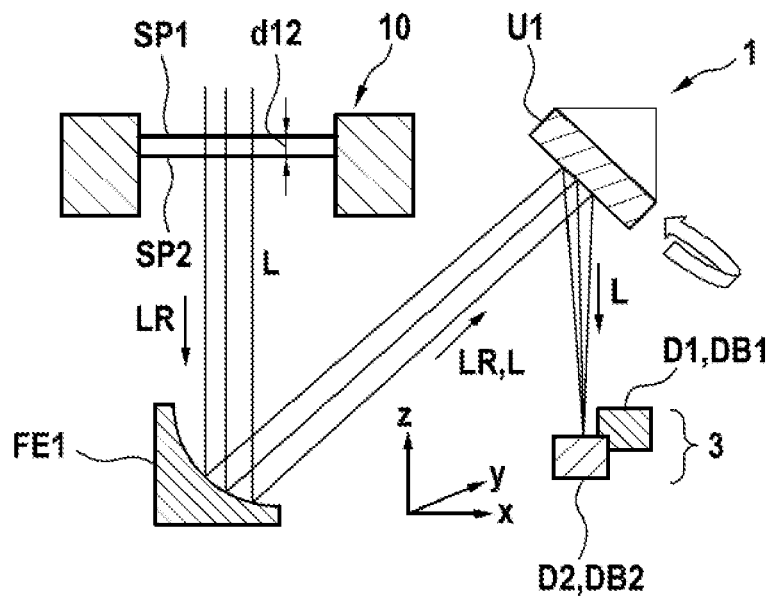
FIG. 3 shows a schematic arrangement of the interferometer device according to a further exemplary embodiment of the present disclosure.

FIG. 3 shows a schematic arrangement of the interferometer device according to a further exemplary embodiment of the present disclosure.

Advantageously, the arrangement of the interferometer device of FIG. 3 only differs from that of FIG. 2 by the arrangement of the deflection mirror US1 and the arrangement of the detector device 3. No control device has been shown in FIG. 3 for reasons of clarity. Disposed between the interferometer unit 10 and the deflection mirror US1, there can be at least one optical element FE1, which can steer and focus the light beams transmitted by the interferometer unit 10 onto the deflection mirror US1. Instead of, or in addition to, an optically focusing element FE1, an angle-restricting optical element or other optical elements can also be disposed at this location or at any other location. The optical element FE1 can advantageously be a reflector and both carry out focusing and restrict the angle of incidence and/or angle of reflection. The reflector advantageously allows a more compact form of the interferometer device. Then, a smaller detector device 3 can be used and can be arranged in such a way that only light from a certain angle of incidence range can be incident on the detector device. Alternatively, use can also be made of other optical elements such as plane mirrors, lenses or more of these or combinations of these. As a result of being able to economize detector area as a result thereof, it is possible to achieve a significant reduction in costs, particularly in the case of infrared detectors.

Figure 4:
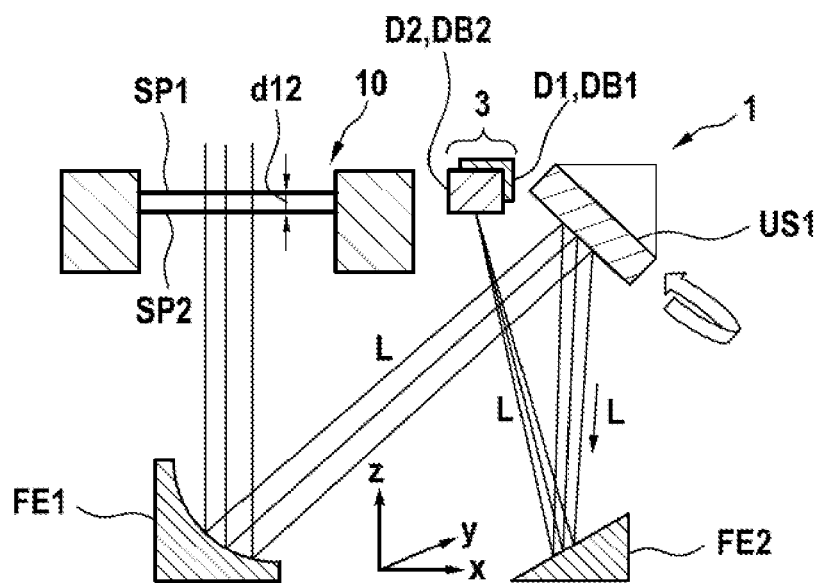
FIG. 4 shows a schematic arrangement of the interferometer device according to a further exemplary embodiment of the present disclosure.

FIG. 4 shows a schematic arrangement of the interferometer device according to a further exemplary embodiment of the present disclosure.

Advantageously, the arrangement of the interferometer device from FIG. 4 only differs by the arrangement of a further optical element FE2, which can be disposed between the deflection mirror US1 and the detector device 3. The further optical element FE2 can likewise comprise a focusing element or an angle-restricting optical element or other optical elements. According to FIG. 4, the further optical element FE2 comprises a reflector, which focuses or deflects the light beams from the deflection mirror US1 onto the detector device 3. To this end, the interferometer device can be embodied in such a way that the reflectors are disposed on one side of the interferometer device and the interferometer unit and the detector device 3 and, advantageously, the deflection mirror US1, too, can be disposed together on another side of the interferometer device. As a result of such an arrangement, the light can be deflected in such a way that all elements with an electrical connection can be situated in one plane (on the same side of the interferometer device). This can be advantageous in respect of laying electrical leads more easily and saving costs.

Figure 5:
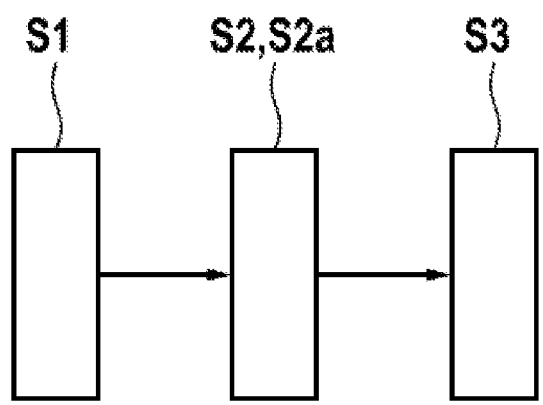
FIG. 5 shows a schematic block diagram of method steps of a method according to one exemplary embodiment of the present disclosure.

FIG. 5 shows a schematic block diagram of method steps of a method according to one exemplary embodiment of the present disclosure.

In the method for operating an interferometer device, there is a provision S1 of an interferometer device according to the disclosure; an actuation S2 of at least one of the mirrors and an alteration S2a of the first distance d12; an alignment S3 of the deflection mirror on one of the detection regions and an irradiation of the detection regions in such a way that light of the same wavelength is successively radiated on different detection regions or each of the detection regions is irradiated by a different wavelength range.

Even though the present disclosure was completely described on the basis of the preferred exemplary embodiment above, it is not restricted thereto but, instead, modifiable in many different ways.

The invention claimed is:

1. An interferometer device, comprising:
an interferometer unit including at least two mirrors disposed in parallel, at least one mirror of the at least two mirrors actuatable parallel to another mirror of the at least two mirrors so as to alter a first distance between the at least two mirrors;
a deflection mirror disposed downstream of the interferometer unit in a light transmission direction of light transmitted by the interferometer unit; and
a detector device, onto which the light is aligned by the deflection mirror, the detector device comprising at least two differently sensitive detection regions for transmitted wavelengths or wavelength ranges of the light, the at least two differently sensitive detection regions spatially separated from one another, wherein the deflection mirror is configured to change alignment to alternately and separately irradiate the at least two differently sensitive detection regions.

2. The interferometer device according to claim 1, wherein the detector device comprises:
one detector that has two spatially separated detection regions of the at least two differently sensitive detection regions; or
a first detector comprising a first detection region of the at least two differently sensitive detection regions and a second detector disposed spatially separated from the first detector and that comprises a second detection region of the at least two differently sensitive detection regions.

3. The interferometer device according to claim 1, wherein the at least two differently sensitive detection regions each comprise a first intensity region with a first sensitivity and a second intensity region with a second sensitivity, wherein:
the first sensitivity is different from the second sensitivity; and the first intensity regions of two adjacently disposed detection regions of the at least two differently sensitive detection regions at least partly overlap in terms of wavelength.

4. The interferometer device according to claim 3, wherein the at least two differently sensitive detection regions comprise different high pass and/or low pass and/or bandpass filters and have a different sensitivity at respective wavelengths.

5. The interferometer device according to claim 1, further comprising:
at least one optical element disposed between the interferometer unit and the deflection mirror and/or between the deflection mirror and the detector device.

6. The interferometer device according to claim 1, further comprising:
a control device connected to the interferometer unit, the detector device, and the deflection mirror and configured to control an actuation of the at least two mirrors of the interferometer unit to change the alignment of the deflection mirror from one of the at least two differently sensitive detection regions to another of the at least two differently sensitive detection regions depending on the transmitted wavelength of the light.

7. The interferometer device according to claim 1, wherein the at least two differently sensitive detection regions are designed for wavelengths of different orders of transmitted intensity maxima.

8. A method for operating an interferometer device that includes (i) an interferometer unit including at least two mirrors disposed in parallel, at least one mirror of the at least two mirrors actuatable parallel to another mirror of the at least two mirrors to alter a first distance between the at least two mirrors, (ii) a deflection mirror disposed downstream of the interferometer unit in a light transmission direction of light transmitted by the interferometer unit, and (iii) a detector device, onto which the light is aligned by the deflection mirror the detector device comprising at least two differently sensitive detection regions for transmitted wavelengths or wavelength ranges of the light, the at least two differently sensitive detection regions spatially separated from one another and configured to be irradiated separately by the deflection mirror, the method comprising:

actuating the actuatable at least one of the at least two mirrors to alter the first distance; and
changing alignment of the deflection mirror to irradiate the at least two differently sensitive detection regions in such a way that light of the same wavelength is successively radiated on different detection regions of the at least two differently sensitive detection regions or each of the at least two differently sensitive detection regions is irradiated alternately by a different wavelength range.

9. The method according to claim 8, wherein the at least two differently sensitive detection regions are designed for wavelengths of different orders of transmitted intensity maxima and wherein the wavelength ranges to be detected partly overlap or differ completely from one another or directly adjoin one another.

10. The method according to claim 8, wherein a first wavelength range comprises fundamental modes of first order and a second wavelength range comprises modes of second order.

11. The method according to claim 8, wherein an operating frequency of the deflection mirror is greater than an actuation frequency of the interferometer unit.

12. The method according to claim 11, wherein:
the changing of the alignment of the deflection mirror includes swiveling the deflection mirror multiple times between the at least two differently sensitive detection regions at a respective actuation position of the deflection mirror; and
the method further comprises correlating a signal from the at least two differently sensitive detection regions with the operating frequency of the deflection mirror and ascertaining a background light impinging on the at least two differently sensitive detection regions.

13. The method according to claim 8, wherein the at least two differently sensitive detection regions are irradiated in such a way that, in the case of a constant transmitted wavelength of the interferometer unit, one or more alignment angles of the deflection mirror are varied and an intensity is determined for each alignment angle of the deflection mirror and an angle of incidence of the light on the interferometer unit is ascertained from the intensity.

* * * * *